(12) United States Patent
Thyni

(10) Patent No.: US 8,171,829 B2
(45) Date of Patent: May 8, 2012

(54) DEVICE FOR LIFTING AT LEAST ONE WHEEL OF A RAILBOUND VEHICLE

(75) Inventor: Kurt-Göran Thyni, Lulea (SE)

(73) Assignee: Euromaint AB (SE)

( * ) Notice: Subject to any disclaimer, the term of this patent is extended or adjusted under 35 U.S.C. 154(b) by 736 days.

(21) Appl. No.: 12/305,666

(22) PCT Filed: Jun. 21, 2007

(86) PCT No.: PCT/SE2007/050457
§ 371 (c)(1),
(2), (4) Date: Dec. 19, 2008

(87) PCT Pub. No.: WO2008/002261
PCT Pub. Date: Jan. 3, 2008

(65) Prior Publication Data
US 2010/0154606 A1    Jun. 24, 2010

(30) Foreign Application Priority Data
Jun. 26, 2006 (SE) ..................... 0601387

(51) Int. Cl.
*B61K 9/12* (2006.01)
*B23B 5/32* (2006.01)
(52) U.S. Cl. .......................... 82/105; 82/128
(58) Field of Classification Search ............ 82/1.11, 82/104, 105; 451/258, 348, 397; 254/133 R, 254/89 R
See application file for complete search history.

(56) References Cited

U.S. PATENT DOCUMENTS

| | | | |
|---|---|---|---|
| 2,622,374 A * | 12/1952 | Stanley | 451/258 |
| 3,203,286 A * | 8/1965 | Dombrowski | 82/11.1 |
| 3,345,890 A * | 10/1967 | Dombrowski | 82/104 |
| 3,473,270 A * | 10/1969 | Byrnes et al. | 451/24 |
| 3,540,164 A * | 11/1970 | Deceuster | 451/397 |
| 3,598,017 A * | 8/1971 | Saari | 409/165 |
| 3,828,689 A | 8/1974 | Raffenberg | |
| 4,068,823 A * | 1/1978 | Belanger | 254/89 H |
| 4,276,793 A * | 7/1981 | Wirtz | 82/1.11 |
| 6,769,365 B1 | 8/2004 | Ward | |
| 2004/0188662 A1 | 9/2004 | Shah | |

FOREIGN PATENT DOCUMENTS

| | | |
|---|---|---|
| EP | 0332489 A1 | 9/1989 |
| GB | 329202 | 5/1930 |
| GB | 2377258 A | 1/2003 |

(Continued)

OTHER PUBLICATIONS

PCT Search Report for PCT Application No. PCT/EP2009/061240, Nov. 11, 2009, 2 pages.
PCT Search Report dated Aug. 10, 2007 of Patent Application No. PCT/SE2007/050457, Jun. 21, 2007.

(Continued)

*Primary Examiner* — Will Fridie, Jr.
(74) *Attorney, Agent, or Firm* — Maine Cernota & Rardin

(57) ABSTRACT

The invention relates to a device for lifting at least one wheel (3, 57) of a rail-bound vehicle, which wheel bears on a rail (5, 71) in a contact point (7, 73). The device comprises a first (9, 59, 63) and a second lifting member (11, 61, 65) adapted to be positioned on each side of the contact point of the wheel, wherein at least the first lifting member comprises a force transfer element (23, 49) comprising an oblique force transfer surface (25a, 25b).

23 Claims, 2 Drawing Sheets

FOREIGN PATENT DOCUMENTS

| | | |
|---|---|---|
| JP | 2002104187 A | 4/2002 |
| RU | 31552 | 8/2003 |
| SU | 458476 | 1/1975 |
| WO | 2008002261 A1 | 1/2008 |

OTHER PUBLICATIONS

LLC "Izdatelstvo Astrel", Big illustrated encyclopedia: Science and technology, 2002, 3 pages.

* cited by examiner

DEVICE FOR LIFTING AT LEAST ONE WHEEL OF A RAILBOUND VEHICLE

TECHNICAL FIELD

The present invention relates to a device for lifting at least one wheel of a rail-bound vehicle.

PRIOR ART

The wheels of rail-bound vehicles are provided with a special wheel profiles along their circumferences, in order to fit the rail. The circumference of the wheel comprises a treading bearing on the rail and a flange projecting our beside the rail in order to hold the rail-bound vehicle onto the rail. The wheels of the rail-bound vehicle are usually arranged in pairs, and the two wheels in one wheel-pair are rigidly connected with each other by a wheel-shaft. The two wheels of a wheel-pair thus usually rotates with the same rotation velocity.

A damage on a wheel may cause damages on the rail or may cause the rail-bound vehicle to go off the rail. The vehicle must therefore be taken to the repair shop in which the vehicle is lifted, after which the wheel-pair with the damaged wheel is replaced. The wheels may thereafter be turned in a lathe so that the wheel profile once again becomes correct. During the lifting of the vehicle a vertically standing hydraulic cylinder is usually arranged to bear on specially provided lifting points on the vehicle. The axle pressure of a rail-bound vehicle is usually around 25 tons. The hydraulic cylinder must therefore be very powerful. Thus the equipment for lifting is very large and heavy so that such a hydraulic cylinder can only be provided in a repair shop. This is a problem since wheel-bound vehicles are often damaged when the vehicle is far from a repair shop, wherein the vehicle can be left immobile. Mobile lifting cranes has therefore been conceived for lifting the vehicle and changing a wheel-pair out on the field. These lifting cranes are relatively weak however, wherein for example a cargo wagon first needs to be emptied before the wagon can be lifted by the crane. Thus the time for a stand still becomes very long.

SUMMARY OF THE INVENTION

The object of the present invention is to indicate a device allowing improved possibilities of repairing a damaged wheel of a rail-bound vehicle.

This object is achieved with a device according to the preamble of claim 1, which is characterized in that the force transfer element is shaped to receive a mainly horizontal force and to be displaced in a mainly horizontal direction, so that the oblique force transfer surface transfers a vertical lifting force to the wheel. By using an oblique force transfer surface a force change takes place, since the horizontal force may be smaller than the resulting vertical lifting force. Furthermore the driving device causing the horizontal force, for example a hydraulic cylinder, may be arranged horizontally, wherein there is more space available for the cylinder, since the length of the cylinder is not limited by the height of the rail-bound vehicle above the ground. The shape of the lifting device may thus be shaped so that the lifting device can be positioned horizontally close to the ground. This is further facilitated in that the lifting device is adapted to lift directly against the wheel and not against the wheel shaft or the gearbox. Furthermore the size and weight of the lifting device becomes substantially smaller, wherein the device more easily may be moved to the location of an immobile rail-bound vehicle. Hence the rail-bound vehicle may be repaired even though it is not inside a repair shop, which substantially decreases the downtime.

According to one embodiment the device comprises a rotation arrangement arranged to rotate the wheel around its wheel center, when the wheel is in an uplifted state. Preferably the rotation arrangement is arranged to rotate the wheel around a rotational axis coinciding with the wheel shaft of the wheel, or wheel-pair. Preferably the device also comprises a lathing arrangement adapted for turning the wheel profile of the wheel when the wheel is in the uplifted state. Thus the wheel may easily be turned in the lathe so that a damaged wheel obtains a new wheel profile so that the rail-bound vehicle may proceed to travel on the wheel. Hence the wheel or the wheel pair does not need to be changed.

According to one embodiment the device is adapted to be connected to an electronic driving arrangement adapted to coordinate the lifting, rotation and turning the wheel in the lathe. Thus the control and the turning of the wheel in the lathe is carried out automatically giving a better and more reliable result.

According to one embodiment the device can be assembled from separate parts, which separate parts are liftable by hand by a human. Preferably the separate parts do not weigh more than 25 kg, more preferably no more than 15 kg, and most preferably no more than 12.5 kg per part. Thus the device may be assembled in the field by a human, so that the device may be used anywhere without the vehicle necessarily being inside a repair shop. Preferably the device can be disassembled into said separate parts, so that the device can be moved from the location of the vehicle. The device is thus modularly constructed.

Preferably the device is adapted so that the device is movable with a vehicle to the location of an immobile rail-bound vehicle. Preferably the vehicle is a truck or some other engine driven vehicle. The device is thus mobile so that the device can be used anywhere. Preferably the vehicle is adapted to provide lifting energy to the device and the device is adapted to receive the lifting energy from the vehicle. Hence it is ensured that the device can be used in the wilds as well since the device receives its energy from the vehicle. Thus the time that a rail-bound vehicle must stand still if it is damaged in the wilds is decreased substantially.

According to one embodiment the first lifting member comprises a lifting wheel adapted to bear on and lift the wheel of the vehicle. By the lifting member comprising a wheel bearing on and lifting the wheel of the vehicle it becomes easier to rotate the wheel of the vehicle without the wheel of the vehicle becoming stuck against some non-moving surface. Furthermore the friction during rotation is less and the wheel of the vehicle is not subjected to wear. Preferably the rotation arrangement is adapted to drive the rotation of the lifting wheel, wherein the rotation of the lifting wheel drives the rotation of the wheel of the vehicle. This ensures a simple and compact construction of the device, since only one, common drive and lifting wheel is needed to lift and rotate the device.

According to one embodiment the lifting wheel is adapted to bear on a wheel flange of the wheel of the vehicle. It is much more frequent that a wheel of a rail-bound vehicle is damaged on its tread than on its wheel flange. Hence it is advantageous to rotate the wheel on the wheel flange, since the damage otherwise may create vibrations in the wheel, which may disturb the turning of the wheel profile in the lathe. Preferably the lifting member is adapted to alternately lift the wheel against the wheel flange and against the tread of the wheel, respectively. Hence the wheel profile of the wheel may effectively be turned in the lathe since the wheel flange may be turned in the lathe as well, when the lifting member lifts the wheel against the tread.

According to one embodiment of the invention the first lifting member comprises an upper and a lower block, wherein the force transfer element is arranged between the blocks. Hence the force transfer element does not bear on the ground or the rail directly, which decreases the friction and simplifies the control of the force transfer element. Preferably the blocks are shaped so that they collectively form a groove adapted to contain the force transfer element and to control the movement of the force transfer element. Thus a better control of the movement of the force transfer element is obtained. Preferably the force transfer element and the blocks are adapted to cooperatively limit the distance that the force transfer element may be displaced. A wheel should preferably be lifted less than 10 mm, more preferably less than 5 mm, and most preferably less than 2-3 mm above the surface of the rail. Hence the wheel flange is not lifted above the surface of the rail, so that the vehicle remains safely standing on the rail. By limiting the movement distance of the force transfer element the risk of lifting the wheel too high, is decreased.

According to one embodiment the force transfer element is wedge-shaped. Such a wedge-shaped force transfer element is easy to shape and easy to adapt with a suitable inclination so that a well-adapted force change is obtained when lifting the wheel. Preferably the force transfer element comprises a gliding surface provided with Teflon. Thus the friction during the displacement of the wedge-shaped force transfer element is decreased so that jamming of the wedge is avoided. In an alternative embodiment the force transfer element may instead comprise a lifting wheel.

According to one embodiment the lifting member is shaped to bear on the rail. Hence the lifting member bears on an even foundation regardless of the present ground or weather conditions. If the lifting member would be adapted to bear on the ground the ground would vary between different locations and times of year, which would cause problems. By the lifting member bearing directly on the rail the lifting member does not need to be adaptable between different locations. Preferably the first lifting member thus comprises a supporting surface adapted to bear on the rail. Preferably the supporting surface is manufactured in aluminium or an aluminium alloy. Aluminium and aluminium alloys are usually soft materials, wherein the rail is not damaged when the lifting member lifts the vehicle.

According to one embodiment the device comprises a supporting arrangement adapted to hold the device onto the rail, which supporting arrangement is shaped so that the supporting arrangement support against the base of the rail. A rail usually comprises an upper tread, a thin middle body and a wider base standing on the ground. The thin middle body is usually so thin that a sideway force may risk to break the rail. Hence it is advantageous to let the device support against the base of the rail for absorption of for example sideway forces and torques.

According to one embodiment the device comprises a supporting rod adapted to hold together the first lifting member with the second lifting member. The supporting rod thus allows that it is easier to press the lifting members together and to raise the lifting members with the force transfer element, so that the vehicle may easily be lifted. Furthermore such a supporting rod supports the device so that the device becomes steady.

According to one embodiment the device comprises a strut adapted to absorb a torque in the sideway direction of the wheel. Hence the device becomes steady so that the wheel does not turn sideways during the lifting of the vehicle. This also allows a more even turning of the wheel profile of the wheel.

Preferably the device comprises four lifting members, wherein the device is adapted to simultaneously lift two wheels belonging to the same wheel axle. During turning of one wheel of a wheel axle in a lathe the diameter of the wheel changes. Thus it is also necessary to turn the wheel on the other side of the wheel axle as well. In order to decrease the time for turning the wheels in the lathe it is advantageous if both the wheels are simultaneously lifted and turned in the lathe. Preferably said strut is arranged to connect a lifting member arranged to lift the first wheel in the wheel-pair and a lifting member arranged to lift the second wheel. Hence only one strut is needed to support the lifting of both wheels.

The device further comprises a measuring arrangement adapted to sense the wheel profile of the wheel. The wheel profile must both be verified for documentation purposes and also it is advantageous to sense the wheel profile before and during the turning of the wheels in the lathe for control of the turning. Thus the vehicle does not need to travel to a repair shop in order to achieve a correct wheel profile, but a correct wheel profile can be turned on spot. The rail-bound vehicle may thus continue its travel directly after completion of the turning of the wheel.

According to one embodiment the measuring device comprises a measuring wheel adapted to bear on the outer circumference of the wheel during the rotation of the wheel. The wheel thus follows the circumference of the wheel so that damages on the circumference is detected. By moving the wheel sideways the wheel profile of the wheel may also be sensed in a simple and inexpensive way. In an alternative embodiment the wheel profile may be measured by optics, for example laser, radio technology, for example microwaves, or with sound waves.

According to one embodiment the device also comprises a support bearing on inside of the wheel during the turning. Preferably the support comprises a supporting wheel bearing on the inside. Preferably the support is tensioned with a spring so that the support is pressed towards the inside of the wheel. The support thus dampens vibrations arising in the wheel during the turning, so that the turning of the wheel profile becomes better.

DESCRIPTION OF ATTACHED DRAWINGS

The invention is now to be described as a number of non-limiting examples of the invention and with reference to the attached drawings.

DETAILED DESCRIPTION

Figure 1:
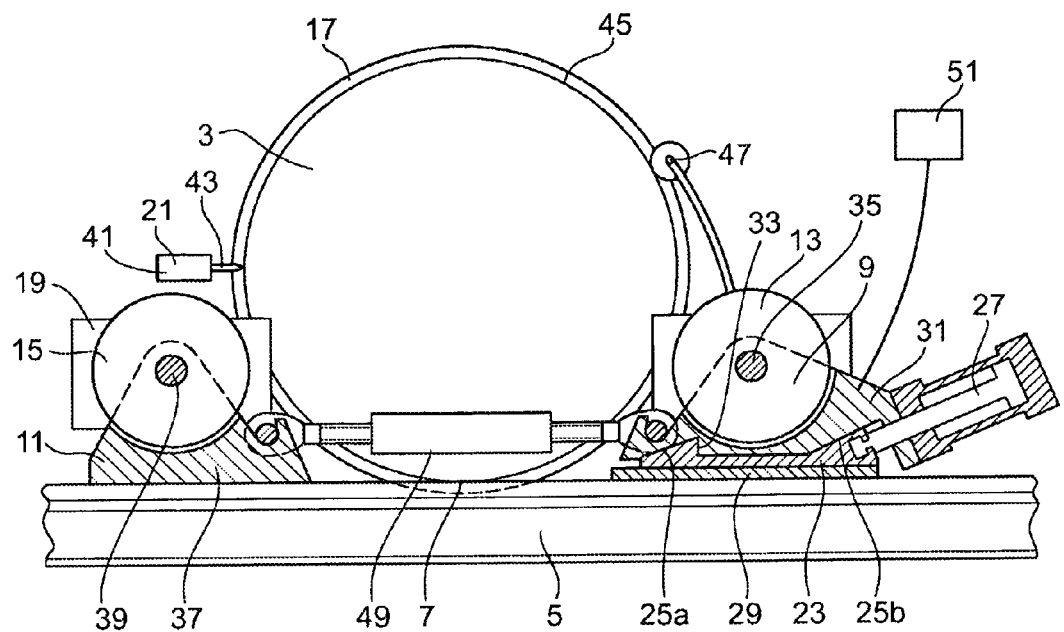
FIG. 1 shows a side view in cross section of a first embodiment of a device.

In FIG. 1 a device 1 according to a first embodiment of the invention is shown. In the figure a train wheel 3 resting on a rail 5 in a contact point 7 is also shown. The device 1 comprises a first lifting member 9 arranged on one side of the contact point 7, and a second lifting member 11 arranged on the other side of the contact point 7. The first and the second lifting members 9, 11 each comprises a lifting wheel 13, 15 arranged to bear on a flange 17 of the train wheel 3. The device 1 further comprises a rotation device 19 arranged to rotate the wheels 13, 15 in order to drive the rotation of the train wheel 3. The device 1 further comprises a lathing arrangement 21 arranged for turning the wheel profile of the train wheel 3 in the lathe.

The first lifting member 13 comprises a force transfer element 23. The force transfer element comprises two oblique force transfer surfaces 25a, 25b. The force transfer element 23 is further shaped to receive a mainly horizontal force from a hydraulic cylinder 27 and to be displaced in a mainly horizontal direction. In this example the force transfer element 23 is shaped to be displaced in a direction towards the second lifting member 15. During the horizontal displacement of the force transfer element 23 the oblique force transfer surfaces 25a, 25b transfer a vertical lifting force transferred to the train wheel 3 and lifting the wheel 3. The rotation arrangement 19 is adapted to rotate the train wheel 3 when the train wheel 3 is in an uplifted state. Furthermore the lathing arrangement 21 is adapted to turn the wheel profile of the train wheel 3.

The first lifting member 13 comprises a lower block 29 and an upper block 31. The force transfer element 23 is arranged enclosed by and between the upper 31 and the lower blocks 29. The lower 29 and upper block 31 are shaped so that they collectively form a groove, or an inner space, adapted to contain the force transfer element 23. The groove is also shaped to control the movement of the force transfer element 23.

The upper side of the force transfer element 23 is shaped to comprise the first 25a and the second oblique force transfer surface 25b. Between the force transfer surfaces 25a, 25b the upper side comprises a substantially plane portion. In the interface between the plane portion and the first force transfer surface 25a the upper side comprises a vertical surface section 33. The underside of the upper block 31 is shaped to follow the upper side of the force transfer element, wherein the upper block 31 also comprises a substantially vertical surface section. The substantially vertical surface sections 33 are adapted to engage each other and thus restrain the movement of the force transfer element. Thus the force transfer element 23 and the upper block 31 are adapted to collectively limit the distance in which the force transfer element 23 may be displaced.

In this example the force transfer element 23 is substantially wedge shaped. The gliding surfaces of the wedge shaped force transfer element 23 are furthermore coated with Teflon in order to decrease the friction when the force transfer element is displaced relative to the lower 29 and the upper block 31.

The shape of the force transfer element shown here is of course only an example of a force transfer element. Other shapes which are useful with the invention are for example a force transfer element with a circular cross section, a square cross section, a rectangular cross section, an oval cross section, a triangular cross section or a irregular cross section. The main thing is that the force transfer element comprises an oblique force transfer surface so that the lifting member 13 acts on the wheel 3 with a force having at least one component in a vertical direction, when the force transfer element is displaced in a mainly horizontal direction.

The lower block 29 is in this example adapted to bear on the rail 5. The lower block 29 comprises a lower surface substantially shaped to follow the upper side of the rail 5. The underside of the lower block 29 is in this example manufactured in an aluminium alloy, which is a soft metal, so that the risk that the lower block 29 damages the rail 5 decreases.

In this example the second lifting member 11 comprises only one block 37. The second lifting member 11 is adapted to remain immovable during the lifting of the wheel. The second lifting member 11 thus acts as a counterhold during the lifting. During the displacement of the force transfer element 23 the lifting wheel 13 is lifted, wherein the wheel 3 is pressed against and upwards along the second lifting member 11, so that the wheel 3 is lifted.

The lifting wheels 13 and 15 in the figure bear on the flange 17 of the wheel 3. Since the lifting members 9, 11 bear on the wheel 3 with the rotatable lifting wheels 13, 15 the wheel 3 may rotate. If the wheel had been lifted by a rigid surface of the lifting members the wheel would otherwise have to slide against the surface, which would cause friction and wear.

The rotation arrangement 19 comprises two driving devices, a shaft 35 arranged to transmit force from a driving arrangement to the lifting wheel 13, and a shaft 39 arranged to transmit force from the second driving arrangement to the lifting wheel 15. The lifting wheels 13, 15 in this example constitute a part of the rotation arrangement 19, wherein the lifting wheels 13, 15 induce the wheel 3 to rotate simultaneously with the lifting wheels 13, 15. In this example the shaft 35 and the wheel 13 are shown as two separate units, but in another example the shaft 35 and the lifting wheel 13 may be manufactured in one piece to increase durability. The driving units are in this example constituted by hydraulic engines, but they may also be constituted by electrical engines, combustion engines or some other type of driving device.

The lathing arrangement 21 comprises a cutting chisel holder 41 and a cutting chisel 43. The lathing arrangement 21 is adapted to turn the wheel profile of the wheel 3, that is the surface constituting the circumference of the wheel. This surface comprises the flange 17 and the tread 45. The flange and the tread will be described in greater detail in connection with FIG. 3. The lathing arrangement 21 is shaped so that the cutting chisel holder 41 is displaceable with at least two degrees of freedom, in this example in the x-direction and in the y-direction. Hence a three dimensional shape may be turned when the wheel 3 is rotated by the rotation arrangement 19. The cutting chisel 43 is exchangeable since the cutting chisel is worn out and regularly must be changed. Furthermore cutting chisels with different shape may be used depending on which surface of the wheel that is to be turned. In this example the lathing arrangement 21 comprises several cutting chisels, wherein the lathing arrangement 21 is shaped to automatically change the cutting chisel depending on which part of the wheel profile that is to be turned.

The device 1 further comprises a measuring arrangement 47 shaped to sense the wheel profile of the wheel. In this example the measuring arrangement comprises a measuring wheel 47 arranged to bear on the circumference of the wheel 3. The measuring wheel 47 is spring tensioned in a direction towards the wheel 3, wherein the radius of the wheel can be measured with the measuring wheel. Alternatively the measuring arrangement may instead measure the wheel profile of the wheel 3 by use of an optical means, for example by pattern recognition or laser optics, by radio technology such as microwaves, acoustically by sound waves, by some other mechanical construction or by a combination of these or some other detection device.

In the figure it is shown, that the device 1 also comprises a rod 49 adapted to hold the first 9 and the second lifting members 11 together. In this example the rod comprises a telescopic device so that the length of the rod may be changed. The rod 49 is thus adapted to apply a tension on the lifting devices towards the wheel 3 when lifting the wheel.

The device 1 is further shaped so that the device in a simple manner is dividable into smaller parts, which parts are liftable by a human. Thus a human may easily assemble the device on the rail 5 without any help from mechanical lifting devices, such as a robot or a truck. Hence the device may also be used out in the field and not only inside a repair shop. Preferably each respective block of the lifting devices, lifting wheels, the force transfer element, the rotation arrangement 19, the driving arrangement 27 and the rod 49 constitute different parts in the device 1, which may be assembled on the location on which a damaged vehicle is situated. Preferably each respective part weigh no more than 25 kg, preferably no more than 15 kg, and most preferably no more than 12.5 kg per part.

The device 1 further comprises a control member 51 arranged to control the device 1. Preferably the control member 51 is a computer comprising a processor adapted to execute a computer program adapted to control the device 1. The control member 51 is thus adapted to receive measuring signals from the measuring arrangement 47 and to control the turning based on the received measuring signals. In this example the control member 51 is adapted to coordinate the lifting of the wheel, the rotation of the wheel and the turning of the wheel.

In the following a method and a use of a device is to be described. When one of the wheels 3 of a rail-bound vehicle has been damaged the rail-bound vehicle is no longer allowed to continue its travel, since the wheel 3 then both risks to be damaged even further and also risks to damage the rail. Furthermore the rail-bound vehicle also risks to run off the rail. The engine driver thus contacts a service unit, which drives to the location where the rail-bound vehicle is immobile with a vehicle comprising a device according to the invention. This vehicle may either be constituted of another rail-bound vehicle or of a ground based vehicle such as a truck. Once at the location the assembly of the device 1 takes place by connecting and attaching the separate parts of the device to each other. Since the parts are liftable by a human the assembly is easy. Furthermore the device 1 is connected to the vehicle so that the device may receive energy from the vehicle.

Thereafter the control member 51 controls the driving arrangement 27 to displace the force transfer element 23 horizontally, wherein the force transfer element 23 transfers a vertical force by its oblique force transfer surfaces 25a, 25b. The lifting wheel 13 is thus lifted vertically and thus also lifts the wheel 3 of the rail-bound vehicle. In this example the lifting wheel 13 first lifts the wheel 3 against the flange 17 of the wheel 3.

The control member 51 then controls the rotation arrangement 19 to rotate the wheel 3. During rotation of the wheel 3 the control member 51 controls the measuring arrangement 47 to bear on the tread of the wheel 3. Thus the shape of the tread 47 is measured and the shape of the damage is assessed.

Depending on the size and shape of the damage the control member 51 selects a turning program wherein the control member 51 controls the lathing arrangement 21 to turn the tread on the wheel 3. After the turning of the tread has been carried out the control member 51 controls the driving member 27 to displace the force transfer element back to its original position, wherein the wheel 3 is lowered. The lifting wheels 13 and 15 are then displaced sideways so that the lifting wheels now will bear on the tread of the wheel. Furthermore the rod 49 is tensioned so that the lifting members 9, 11 are moved somewhat closer each other since the tread has smaller diameter than the flange 17. The control member 51 then once again controls the driving member 27 to displace the force transfer element 23 so that the wheel 3 is lifted. Then the control member 51 controls the rotation arrangement 19 to rotate the wheel 3 around the centre of the wheel, wherein the measuring arrangement 47 measures the flange 17. The control member 51 controls the lathing arrangement 21 to turn the flange 17 of the wheel based on the signals from the measuring arrangement 47. The measuring arrangement 47 is adapted to bear on the tread and flange respectively during the entire turning procedure in order to return signals about the wheel profile to the control member 51.

After concluded turning the control member controls the measuring arrangement to perform a finishing measurement of the wheel profile of the wheel 3. If the measuring arrangement 47 senses a correct wheel profile this is documented and the control member 51 controls the device 1 to once again lower the wheel by the driving member 27 displacing the force transfer element 23 horizontally back to its original position. In other case the control member 51 controls the device to continue the turning until the wheel profile is correct. The wheel 3 is thus turned at the location of the train, so that it obtains a correct wheel profile and may be continued to be used. The device 1 is disassembled and is then divided into its respective parts and loaded into the service vehicle. The rail-bound vehicle is now ready to continue its travel towards the next station.

Figure 2:
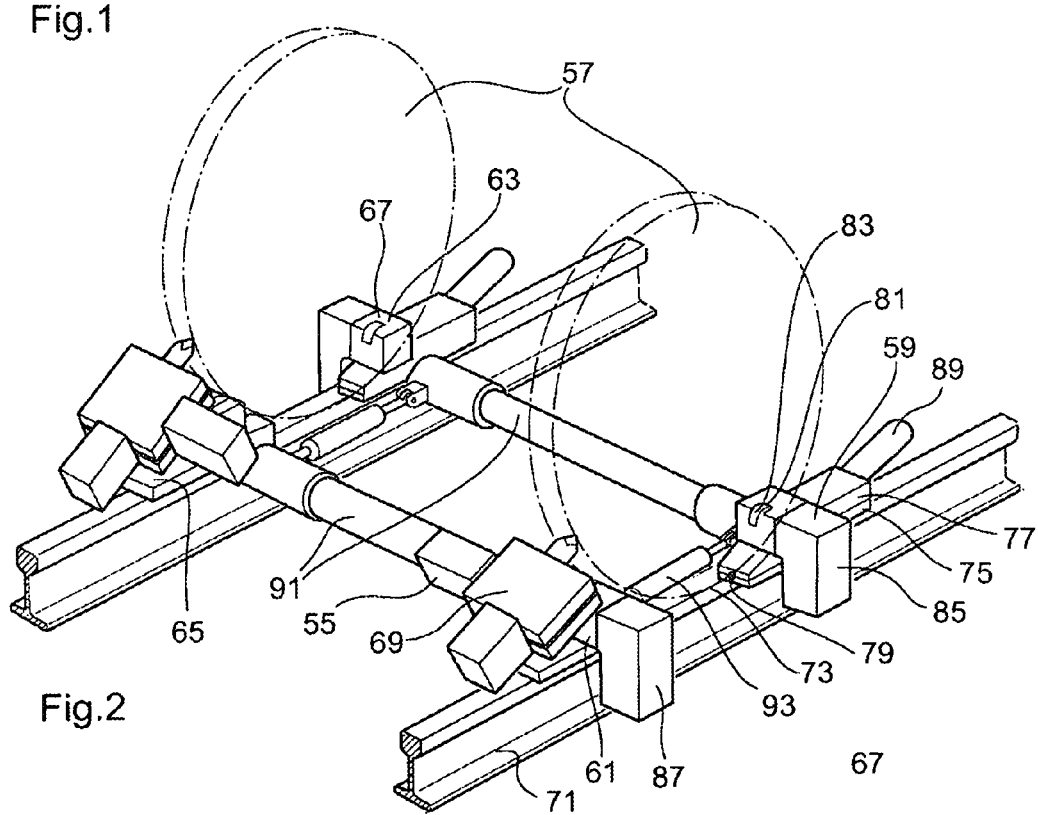
FIG. 2 shows an elevation of a second embodiment of a device.

In FIG. 2 a further example of a device 55 shaped to simultaneously lift a wheel-pair 57 arranged on a common wheel axle (not shown) is shown. As the device in FIG. 1 the device 55 comprises a first 59 and a second lifting members 61. The device further comprises a third lifting member 63 shaped in a corresponding way as the first lifting member 59 and fourth lifting member 65 shaped in a corresponding way as the second lifting member 61. The first and the second lifting members 59, 61 are shaped to lift one of the wheels 57 while the third 63 and the fourth lifting members 65 are adapted to lift the second wheel 57. In the following only the first and the second lifting members 59, 61 will therefore be described. The device 55 further comprises two, rotation arrangements 67 and two lathing arrangements 69, respectively.

The first lifting member 59 is adapted to bear on a rail 71 on one side of a contact point 73 between the wheel 57 and the rail 71. The second lifting member 61 is in a corresponding way adapted to bear on the rail 71 on the other side of the contact point 73. The first lifting member 59 comprises a lower 75 and an upper block 77 adapted to collectively form a groove, which contains a force transfer element 79. In this example the force transfer element 79 is substantially cone shaped. The first lifting member 59 comprises a bearing 81 mounted on the upper block 77 and which is arranged to bearingly hold a first lifting wheel 83 adapted to bear on the outer circumference of the wheel 57. The second lifting member 61 comprises in a corresponding way a bearing and a lifting wheel 84 as a counterhold during the lifting.

The first lifting member 59 further comprises a supporting element 85 adapted to support against the base of the rail 71. The supporting element 85 thus ensures holding the first lifting member 59 in place on the rail 71. In a corresponding way the second lifting member 61 comprises a second supporting element 87. In this example said rotation arrangements 67 are arranged inside the supporting elements 85, 87 in order to save space.

The first lifting member 59 comprises a driving arrangement 89 in the form of a hydraulic cylinder shaped to drive the displacement of the force transfer element in a mainly horizontal direction. During displacement of the force transfer element 79 the upper part of the lifting member is lifted upwards due to an oblique force transfer surface (not shown)

of the cone shaped force transfer element 79. Thus the wheel 57 is also lifted so that the wheel may be rotated by the rotation arrangement 67 and may be turned by the lathing arrangement 69.

The device 55 further comprises two supporting struts 91 arranged to connect the first 59 and the third lifting members 63 and the second 61 and fourth lifting members 65 respectively. The supporting struts are shaped so that they absorb a sideway torque arising when lifting the wheel-pair 57. Thus the device 55 becomes more stable during the turning. The device further comprises a rod 93 arranged to hold the first 59 and the second 59 lifting members 61 together. A corresponding rod is arranged to connect the third and the fourth supporting member. The supporting struts 91 and the rods 93, respectively, are telescopic so that their lengths can be changed. Thus the device may be put in tension so that it may be steadily arranged on the rail.

Figure 3:
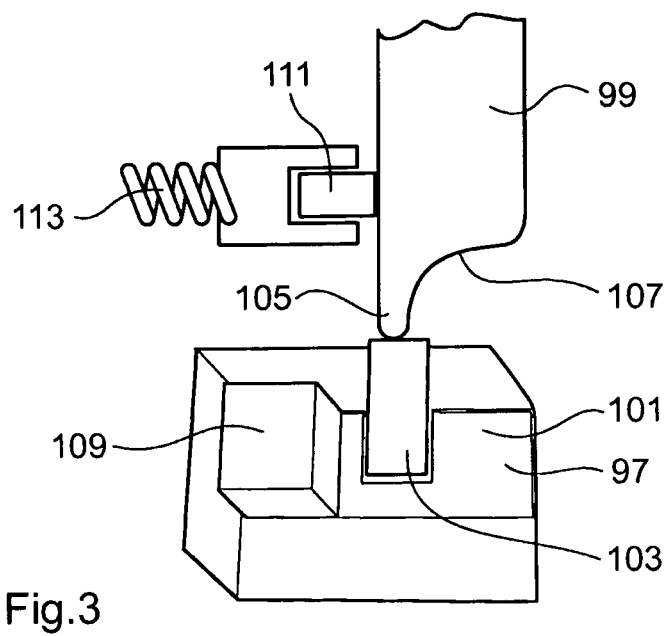
FIG. 3 shows a detailed view of a part of a device according to a third embodiment.

In FIG. 3 a detailed view of a smaller part of a lifting arrangement 97 and a wheel 99 are shown. In FIG. 3 the upper part of a lifting member 101 comprising a lifting wheel 103 adapted to bear on the outer circumference of the wheel 99 is shown. The wheel 99 is shaped with a flange 105 having a larger diameter, and a tread 107, which is arranged to incline slightly and having a smaller diameter than the corresponding flange 105. The wheel 99 is adapted to bear on a rail with its tread 107, while the flange 105 is adapted to project out beside the rail. The flange 105 thus helps to hold the wheel in place on the rail so that the rail-bound vehicle is kept on the rail.

In this example it is shown how the lifting wheel 103 bears on the flange 105. As shown in FIG. 3 the upper part of the lifting member is shaped with a notch 109 at the side of the lifting wheel 103. The notch 109 is adapted so that the lifting member 101 may be moved sideways so that the lifting wheel 103 instead bears on the tread 107, wherein the flange 105 finds room inside the notch 109 without being obstructed by the lifting member 101. In an alternative embodiment the lifting wheel 103 may instead be arranged to project such a distance outside the part holding the lifting wheel that the flange will not be in contact with the lifting member. The lifting wheel 103 must then be shaped with a diameter, which is larger than the depth of the flange.

The device 97 further comprises an inner supporting wheel 111 adapted to bear on the inside of the wheel 99. The inner supporting wheel 111 is tensioned with a spring 113 so that the supporting wheel 111 is pressed against the inside of the wheel 99. The wheel 111 and the spring 113 are thus arranged to absorb vibrations arising in the train-wheel 99 when it is rotated and turned by the device 97. Hence the quality of the turning is increased.

Figure 4:
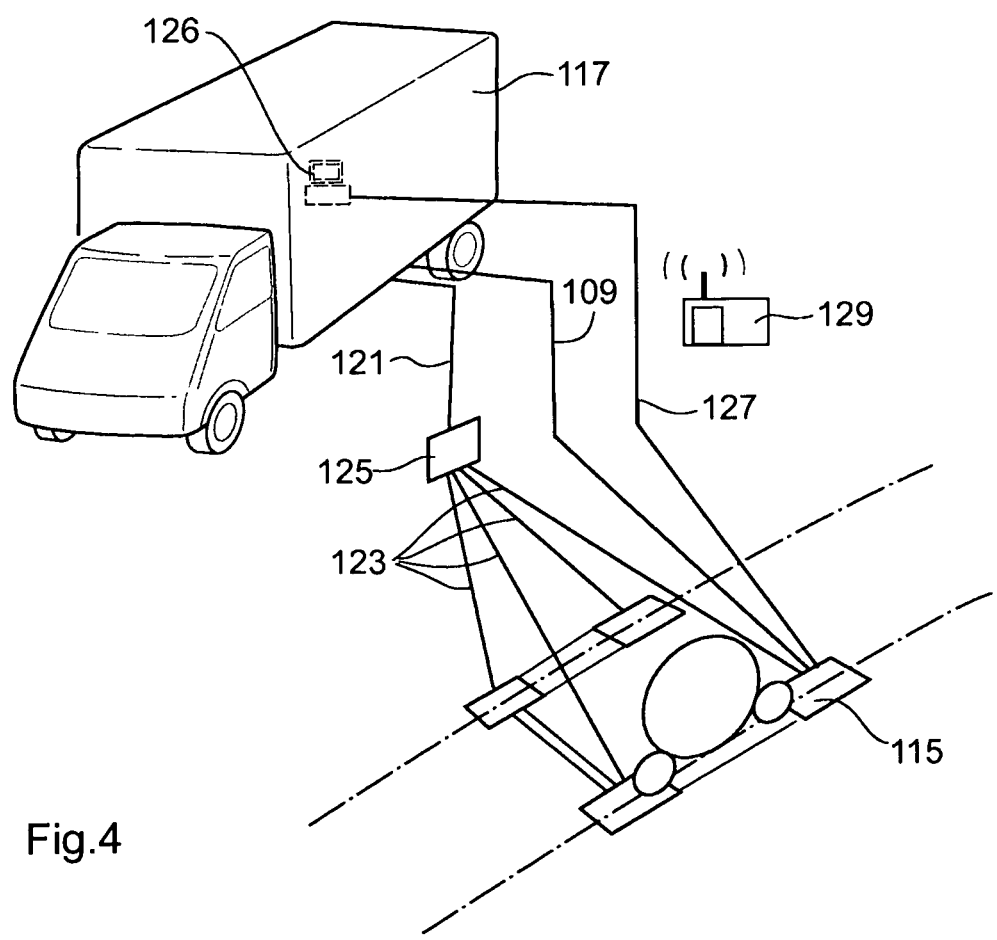
FIG. 4 shows an elevation of a fourth embodiment of a device comprising and being connected with a vehicle.

In FIG. 4 a further example of a device 115 according to the invention is shown. The device 115 can be designed in accordance with any of the embodiments in FIG. 1, 2 or 3 or according to some other suitable embodiment. As apparent from the figure the device 115 comprises a vehicle 117 adapted for moving the device to the location of an immobile rail-bound vehicle. The vehicle 117 is further adapted to provide energy to the lifting device 115. In this example an electric cable 119 providing electrical power to the lifting arrangement 115 is shown. Furthermore a hydraulic cable 121 adapted to provide hydraulic power to the lifting arrangement 115 is shown. The device 115 also comprises a hydraulic gear 125 adapted to separate the cable 121 into four separate hydraulic cables 123, which are connected to one lifting member/rotation arrangement each.

In FIG. 4 a control member 126 in the form of a computer is also shown, which is located onboard the vehicle 117, and a signal cable 127 adapted to transmit signals to and from the device 115 and the control member 126. In the figure a hand-held maneuvering unit 129 adapted to communicate wirelessly with the control member 126 is also shown. Thus an operator standing outside the vehicle may control the lifting, rotating and turning of the wheels while the operator visually monitors the process. This increases the safety during the turning and lifting.

The invention has only been described as a number of non-limiting examples of the invention, which may be varied within the framework of the following claims. In particular features mentioned with each respective example may be freely mixed with the features of another example and technical features may be left out, interchanged, changed or added without departing from the invention.

The invention claimed is:

1. A device for lifting at least one wheel of a rail-bound vehicle, the wheel bearing against a rail in a contact point, which device comprises a first and a second lifting member adapted to be positioned on each side of the contact point of the wheel, wherein at least the first lifting member comprises a force transfer element comprising an oblique force transfer surface, wherein the force transfer element is adapted to receive a substantially horizontal force and to be displaced in a substantially horizontal direction, so that the oblique force transfer surface transfers a vertical lifting force to the wheel;

the first lifting member comprises an upper and a lower block, wherein the force transfer element is arranged between the upper and lower blocks; and the upper and lower blocks are shaped so that they collectively form a groove adapted to contain the force transfer element and to control the movement of the force transfer element.

2. A device according to claim 1, wherein the device comprises a rotation arrangement arranged to rotate the wheel around its wheel centre when the wheel is in an uplifted state.

3. A device according to claim 2, wherein the device comprises a lathing arrangement adapted to turn the wheel profile of the wheel when the wheel is in the uplifted state.

4. A device according to claim 3, wherein the device is adapted to be connected with an electronic control arrangement adapted to coordinate the lifting, rotation and turning of the wheel.

5. A device according to claim 1, wherein the device can be assembled from separate parts, which separate parts are liftable by a human by hand.

6. A device according to claim 5, further comprising a second vehicle whereby said device is moved into position and whereby said device is powered.

7. A device according to claim 1, wherein the first lifting member comprises a lifting wheel adapted to bear on and to lift the wheel of the vehicle.

8. A device according to claim 7, wherein the rotation arrangement is adapted to drive the lifting wheel to rotate, wherein the rotation of the lifting wheel drives the rotation of the wheel of the vehicle.

9. A device according to claim 8, wherein the lifting wheel is adapted to bear on a wheel flange of the wheel of the vehicle.

10. A device according to claim 9, wherein the lifting member is adapted to alternately lift the wheel against the flange of the wheel and against a tread of the wheel, respectively.

11. A device according to claim 1, wherein the force transfer element and the blocks are adapted to cooperatively limit the distance that the force transfer element is displaceable.

12. A device according to claim 1, wherein the force transfer element is wedge shaped.

13. A device according to claim 1, wherein the force transfer element comprises a gliding surface provided with PTFE.

14. A device according claim 1, wherein the first lifting member is shaped to bear on the rail.

15. A device according to claim 14, wherein the first lifting member comprises a supporting surface adapted to bear on the rail, wherein the supporting surface is manufactured from an aluminium or an aluminium alloy.

16. A device according to claim 1, wherein the device comprises a supporting arrangement adapted to hold the device on the rail, which supporting arrangement is adapted so that the supporting arrangement supports against the base of the rail.

17. A device according to claim 1, wherein the device comprises a supporting rod adapted to hold together the first lifting member with the second lifting member.

18. A device according to claim 1, wherein the device comprises a strut adapted to absorb a torque in a sideway direction of the wheel.

19. A device according to claim 1, wherein the device comprises four lifting members and is adapted to simultaneously lift two wheels belonging to the same wheel axle.

20. A device according to claim 19, wherein a strut is adapted to connect a first said lifting member arranged to lift a first said wheel and a second said lifting member arranged to lift a second said wheel on the same wheel axle.

21. A device according to claim 1, wherein the device comprises a measuring arrangement adapted to sense the wheel profile of the wheel.

22. A device according to claim 21, wherein the measuring arrangement comprises a measuring wheel adapted to bear on the circumference of the wheel during the rotation of the wheel.

23. A device according to claim 2, wherein the device comprises a supporting wheel bearing on the inside of the wheel during rotation of the wheel.

* * * * *

UNITED STATES PATENT AND TRADEMARK OFFICE
CERTIFICATE OF CORRECTION

PATENT NO. : 8,171,829 B2
APPLICATION NO. : 12/305666
DATED : May 8, 2012
INVENTOR(S) : Kurt-Goran Thyni It is certified that error appears in the above-identified patent and that said Letters Patent is hereby corrected as shown below:

In the Specifications:

Column 1
Line 4, insert -- RELATED APPLICATIONS
This application is a US National Phase Application of PCT Application Number PCT/SE2007/050467, filed June 21, 2007, which, claims priority to Swedish Patent Application No. SE0601387-4, filed June 26, 2006. --

Column 3
Line 23, delete entire paragraph, insert -- According to one embodiment the force transfer element is wedge-shaped. Such a wedge-shaped force transfer element is easy to shape and easy to adapt with a suitable inclination so that a well-adapted force change is obtained when lifting the wheel. Preferably the force transfer element comprises a gliding surface provided with or consisting of a polytetrafluoroethene (PTFE) such as is marketed under the brand name Teflon, or other substance of similar characteristics. Thus the friction during the displacement of the wedge-shaped force transfer element is decreased so that jamming of the wedge is avoided. In an alternative embodiment the force transfer element may instead comprise a lifting wheel. --

Column 5
Line 45, delete entire paragraph, insert -- In this example the force transfer element 23 is substantially wedge shaped. The gliding surfaces of the wedge shaped force transfer element 23 are furthermore coated with a substance such as Teflon brand PTFE in order to decrease the friction when the force transfer element is displaced relative to the lower 29 and the upper block 31. --

Signed and Sealed this
Thirtieth Day of April, 2013

Teresa Stanek Rea
*Acting Director of the United States Patent and Trademark Office*